(12) United States Patent
Searancke

(10) Patent No.: US 7,836,830 B2
(45) Date of Patent: Nov. 23, 2010

(54) RAILWAY BOGIE PROVIDED WITH A LINEAR INDUCTION MOTOR

(75) Inventor: Edwin Joseph Searancke, Croix (FR)

(73) Assignee: Bombardier Transportation GmbH, Berlin (DE)

( * ) Notice: Subject to any disclaimer, the term of this patent is extended or adjusted under 35 U.S.C. 154(b) by 395 days.

(21) Appl. No.: 11/642,672

(22) Filed: Dec. 21, 2006

(65) Prior Publication Data

US 2007/0193471 A1 Aug. 23, 2007

(30) Foreign Application Priority Data

Dec. 23, 2005 (EP) .................................. 05028323

(51) Int. Cl.
*B60L 13/03* (2006.01)
(52) U.S. Cl. .................. 104/290; 104/293; 105/139
(58) Field of Classification Search ................ 104/287, 104/290, 291, 293; 105/133, 139
See application file for complete search history.

(56) References Cited

U.S. PATENT DOCUMENTS

| | | | | |
|---|---|---|---|---|
| 2,781,990 A | * | 2/1957 | Via | 267/141.7 |
| 3,516,364 A | * | 6/1970 | Machefert-Tassin | 105/49 |
| 3,602,149 A | * | 8/1971 | Lich | 104/291 |
| 3,847,089 A | * | 11/1974 | Nelson | 104/291 |
| 3,855,940 A | * | 12/1974 | Pinto | 105/77 |
| 3,958,669 A | * | 5/1976 | Schmied | 188/165 |
| 4,440,092 A | * | 4/1984 | Sobolewski | 104/291 |
| 4,593,625 A | * | 6/1986 | Shimizu et al. | 105/182.1 |
| 5,117,136 A | * | 5/1992 | Kobayashi et al. | 310/12 |
| 5,787,815 A | * | 8/1998 | Andersson et al. | 105/199.2 |
| 6,732,658 B1 | * | 5/2004 | Shaw | 104/291 |

FOREIGN PATENT DOCUMENTS

| | | | |
|---|---|---|---|
| FR | 2052007 | | 4/1971 |
| FR | 2159772 | | 6/1973 |
| GB | 1275187 | | 5/1972 |
| JP | 10044993 A | * | 2/1998 |

\* cited by examiner

*Primary Examiner*—S. Joseph Morano
*Assistant Examiner*—Zachary Kuhfuss
(74) *Attorney, Agent, or Firm*—David P. Owen; Coraline J. Haitjema; Howrey LLP

(57) ABSTRACT

A railway bogie is provided with two cross-members for supporting a linear induction motor, mounted on the axle boxes via of resilient mounting apparatus allowing pivoting movement of each cross-member about a transversal axis of rotation. A system of five links is used to connect the linear induction motor to the cross-members. The links are located in such a way that the resultant of the vertical forces transmitted by the linear induction motor to each cross-member is located at a first centre position on the first transversal axis equidistant from the axle boxes. The mounting apparatus are further provided with height adjusters that allow adjustment of the height and cross level position of the linear induction motor.

14 Claims, 3 Drawing Sheets

RAILWAY BOGIE PROVIDED WITH A LINEAR INDUCTION MOTOR

CROSS REFERENCE TO RELATED APPLICATIONS

This application claims priority from European application number 05028323.3 filed on 23 Dec. 2005, the contents of which are hereby incorporated by reference in their entirety.

BACKGROUND OF THE INVENTION

1. Field of the Invention

The invention relates to a railway bogie designed for propulsion by a linear induction motor, to an arrangement for mounting a linear induction motor to a bogie of a railway vehicle, in particular an arrangement equipped with an adjustment device for adjusting the height of the linear induction motor relative to a reaction rail. It also relates to a method for mounting a linear induction motor to a bogie of a railway vehicle, and to a method for adjusting the distance between the linear motor and the reaction rail.

2. Description of the Related Art

Linear inductors consisting of field windings placed above one or several reaction rails and supplied with poly-phase current producing a moving field between the field windings on the vehicle and the running surface of the rails are used in railway vehicles for providing electromagnetic brakes and/or linear motor propulsion units. In all cases, correct and controllable operation of the electromagnetic brake or motor requires the preservation, during normal service, of a constant or nearly constant air gap between the field windings and the running surface of the reaction rail. This air gap is smaller for linear induction motors than for electromagnetic brakes, typically between 9 and 24 mm.

A resilient supporting device for a railway linear motor is disclosed in U.S. Pat. No. 3,516,364. The field windings are attached to a rigid frame connecting the four axle boxes of a conventional bogie. The rigid frame consists of two longitudinal members whose ends rest on the four axle boxes of the wheel axles, and two cross members. Two inductors are located on each side of the longitudinal vertical mid plane of the bogie. Each inductor is supported via a series of lateral resilient studs on the longitudinal members. Additional longitudinal resilient studs are used to transmit longitudinal traction forces to the cross-members. The longitudinal frame members are attached to the axle boxes via means comprising a screw and nut connection for adjusting the vertical position of the longitudinal member with respect to the axle boxes. However, precise adjustment of the position of the frame and inductors proves difficult, since each of the four screw and nut connections simultaneously influences the roll and pitch angles of the frame.

A steerable railway truck with a linear induction motor is known from U.S. Pat. No. 4,440,092. The truck is supported on four flanged wheels, whose wheel axles are rotationally retained in journal housings. The journal housings are secured to a front and a rear yoke, respectively. The truck is connected to the car body of the railway vehicle by means of a bolster and associated secondary suspension elements to support the car body. The front and rear yoke are articulated to the bolster to allow steering of the front and rear axles. The linear induction motor is supported relative to the yokes by means of a system of three vertical links, comprising one single link centrally positioned in the mid vertical longitudinal plane of the bogie to connect the linear motor unit to the outboard yoke and a pair of suspension links located on opposite sides and at equal distance of the mid vertical longitudinal plane of the bogie.

A bogie with a linear induction motor is known from EP 0 102 551. The bogie is provided with two wheel sets, each provided with a pair of axle boxes, a saddle casting fitted over each axle box to allow relative vertical motion between the axle box and the saddle, a bogie frame rigidly secured to the four saddle and a primary suspension between the interposed between the frame and the axle boxes. The axle on each wheel set is surrounded by a U-shaped beam supported at its ends on a pair of bearings located close to the wheels. Each beam is provided with one centrally located resilient universal joint for hanging one longitudinal end of an inductor of a linear induction motor. This arrangement does not provide any resilient suspension of the U-shape beams, and the bearings between the beams and the shaft experience high acceleration levels. The linear inductor motor is supported by two universal joints only and is free to roll about a longitudinal horizontal axis crossing the centres of the universal joints. This motion, however, is not acceptable when the air gap is small. Moreover, it is not possible to adjust the cross-level error of the linear inductor, i.e. the height difference between the left and right sides of the inductor, because the inductor is suspended from two points only spaced apart along the longitudinal centre axis of the vehicle.

BRIEF SUMMARY OF THE INVENTION

One object of the invention is to provide a bogie that allows very small air gaps between the linear inductor motor and the reaction rail.

Another object of the invention is to provide a bogie that has a suspension optimised both for supporting a vehicle body and for the specific needs of a linear inductor.

According to a first aspect of the invention, there is provided a railway bogie for supporting a car body of a railway vehicle, comprising:

two wheel sets, each journalled in a pair of left and right axles boxes;

a bogie frame, supported on the axle boxes via of a primary suspension and provided with a secondary suspension for supporting the car body;

two cross-members, each mounted on one of the pairs of left and right axle boxes via of left and right resilient mounting apparatus, the resilient mounting apparatus allowing limited pivoting movement of the cross-member about a transversal axis of rotation of the cross-member, and linking apparatus for connecting a linear induction motor to each cross-member, the linking apparatus means being such that the point of application of the resultant force applied by the linking apparatus means on each cross-member is located at a centre position on the rotation axis of the cross-member at equal distance from the left and right mounting apparatus.

Thanks to this arrangement, the primary and secondary suspensions can be designed independently from the resilient mounting apparatus for the linear induction motor suspension. Each of the three suspension systems can be optimised without being constrained by the others.

Advantageously, the linking apparatus allows relative displacement between the linear induction motor and the cross-members in the thrust direction and the bogie further comprises a thrust transmitter for directly transmitting thrust between the linear induction motor and the bogie or the car body of the railway vehicle.

Advantageously, the linking apparatus allows relative displacement between the linear induction motor and cross-members in a transverse direction of the bogie, the bogie further comprising lateral linking apparatus for directly transmitting lateral forces between the linear induction motor and the bogie or the car body of the railway vehicle.

Preferably, the linking apparatus includes at least two link members for connecting the linear induction motor to a first one of the two cross-members, the two link members being connected to the first cross-member at two locations laterally spaced apart on opposite sides of the centre point of the first cross member, and at least one link member for connecting the linear induction motor to the other cross-member. Thanks to this three-point leveling arrangement, height errors in the position of the linear induction motor can be easily corrected.

Advantageously, the linking apparatus includes a set of three vertical link members for connecting the linear induction motor to a first one of the two cross-members and consisting of a central link pivotally connected to the first cross-member longitudinally on one side of the first cross-member and a pair of left and right link members pivotally connected to the first cross-member on the other side of the first cross-member at two locations laterally spaced apart on opposite sides of the centre point of the first cross member and equidistant therefrom, the three link members being pivotally connected to the linear induction motor.

Advantageously, the linking apparatus further comprises a set of two vertical link members pivotally connected to the linear induction motor and to the second cross-member at two locations longitudinally spaced apart on opposite sides of the axis of rotation of the second cross-member.

Preferably, the left and right mounting apparatus comprise left and right height adjustment mechanisms for adjusting the distance between the cross-members and the axle boxes. Each height adjustment mechanism may comprise a first adjuster element provided with an internal thread, a second adjuster element provided with an external thread, one of the first and second adjuster elements being secured to the corresponding axle box and the other adjuster element being secured to the cross-member through a rubber spring.

The adjustment mechanisms allow ready adjustment of the air gap between the reaction rail and the linear induction motor. More specifically, these mechanisms allow independent adjustment of the height, of the pitch angle and of the roll angle of the linear induction motor in relation to the reaction rail.

According to a second aspect of the invention, there is provided a method for mounting a linear induction motor to the bogie, comprising a step of mounting the linear induction motor to the first and second cross-members by means of the linking apparatus and a step of measuring the distance between the linear induction motor and the reaction rail at least three, preferably four locations, a step of assessing a cross level error based on the measured distances, and a step of operating the height adjustment mechanisms of the left and right mounting apparatus of one of the cross-members based on the cross level error.

According to a third aspect of the invention, there is provided a method for mounting a linear induction motor to the bogie, comprising a step of mounting the linear induction motor to the first and second cross-members by means of the linking apparatus and a step of measuring the distance between the linear induction motor the reaction rail at at least three, preferably four locations, a step of assessing a first height deviation from a predetermined desired height at a first longitudinal end of the inductor, and a second height deviation from the predetermined desired height at a second longitudinal end of the inductor, based on the measured distances, a step of operating the height adjustment mechanisms of the left and right mounting apparatus close to the first longitudinal end of the linear induction motor based on the first height deviation; and a step of operating the height adjustment mechanisms of the left and right mounting apparatus close to the second longitudinal end of the inductor based on the second height deviation.

According to a fourth aspect of the invention, there is provided a method for mounting a linear induction motor to the bogie, comprising a step of mounting the linear induction motor to the first and second cross-members via the linking apparatus and a step of measuring the distance between the linear induction motor the reaction rail at at least three, preferably four locations, a step of assessing a first height deviation from a predetermined desired height at a first longitudinal end of the inductor, and a second height deviation from the predetermined desired height at a second longitudinal end of the inductor, based on the measured distances, a step of assessing a cross level error based on the measured distances, a step of operating the height adjustment mechanisms of the left and right mounting apparatus close to the first longitudinal end of the inductor based on the first height deviation; and a step of operating the height adjustment mechanisms of the left and right mounting apparatus close to the second longitudinal end of the inductor based on the second height deviation and on the cross level error.

According to a fifth aspect of the invention, there is provided a method for adjusting the position of a linear induction motor mounted on a bogie as described hereinbefore, comprising the steps of:

measuring the distance between the linear induction motor and the reaction rail at at least three, preferably four locations.

assessing a first height deviation from a predetermined desired height at a first longitudinal end of the inductor, and a second height deviation from the predetermined desired height at a second longitudinal end of the linear induction motor, based on the measured distances, assessing a cross level error based on the measured distances, operating the height adjustment mechanisms of the left and right mounting apparatus close to the first longitudinal end of the linear induction motor based on the first height deviation; and operating the height adjustment mechanisms of the left and right mounting apparatus close to the second longitudinal end of the linear induction motor based on the second height deviation and on the cross level error.

BRIEF DESCRIPTION OF THE DRAWINGS

Other advantages and features of the invention will become more clearly apparent from the following description of a specific embodiment of the invention given as a non-restrictive example only and represented in the accompanying drawings in which.

DESCRIPTION OF ILLUSTRATIVE EMBODIMENTS

Figure 1:
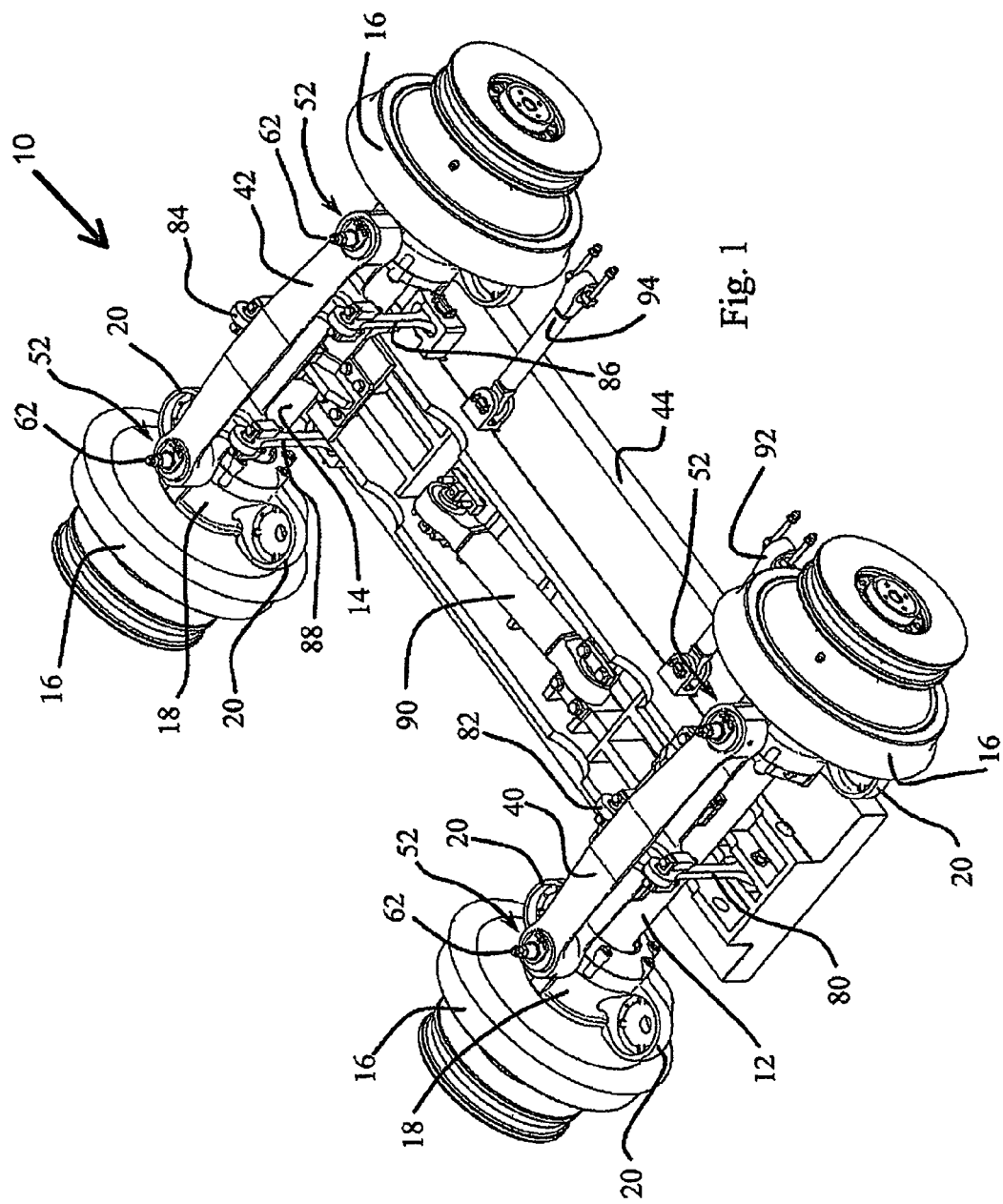
FIG. 1 is perspective view of a lower part of a bogie in accordance with the invention.

Referring to FIG. 1, the unsuspended part of a bogie 10 includes two wheel axles 12, 14 carrying the usual left and right track wheels 16. Each wheel axle 12, 14 is journalled in a pair of left and right axle boxes 18 located between the track wheels 16. Each axle box 18 is provided with front and rear pans 20 on which the lower end of a rubber spring 22 of the primary suspension seats is located.

Figure 2:
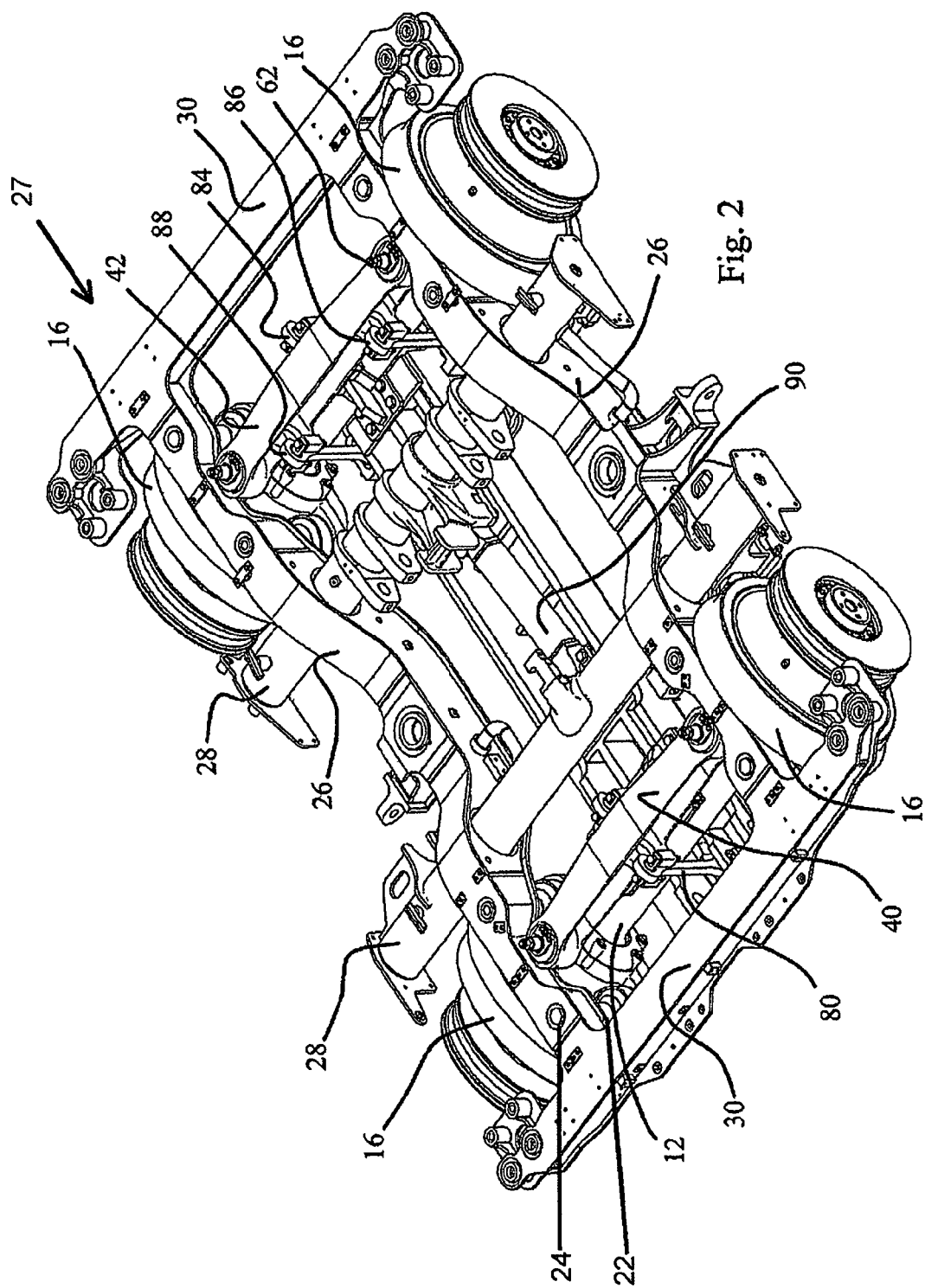
FIG. 2 is a perspective view of the bogie of FIG. 1.

Each primary suspension spring 22 is screwed at its upper end to a spindle 24 that projects through a side bogie frame member 26 and is secured thereto, as illustrated in FIG. 2. The bogie frame 27 is provided with a pair of tubular transoms 28 and front and rear cross-members 30 welded to the side members 26. The vehicle body is supported on the bogie side members by an air spring assembly.

Figure 3:
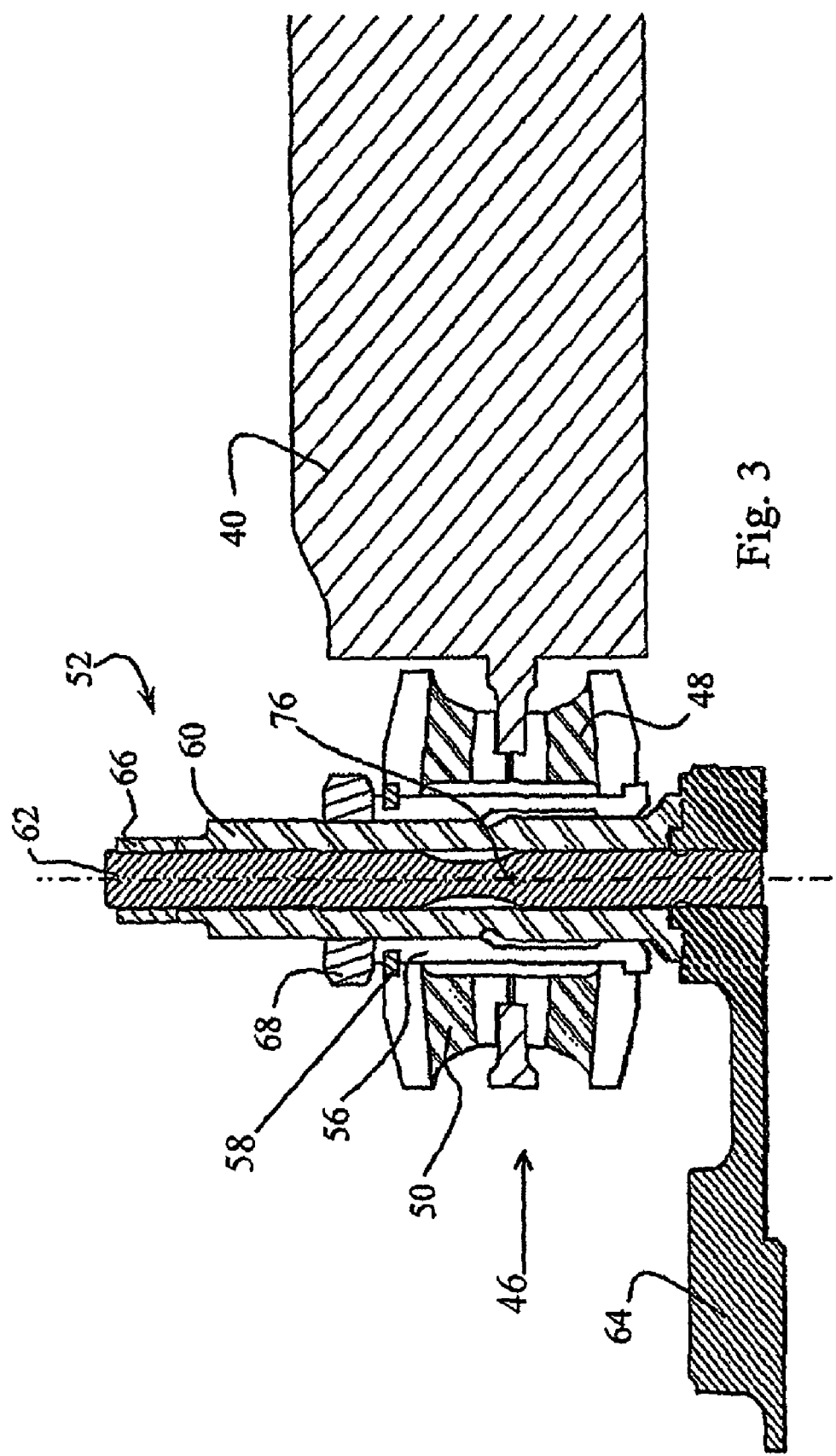
FIG. 3 is a section of the adjuster and the resilient connection of the bogie of FIG. 1.

As shown in FIG. 2, the bogie is provided with a pair of cross-members 40, 42 for supporting the linear induction motor 44. Each cross-member 42, 44 extends above one of the wheel axles 12, 14 and is provided with two mounting eyes 46 at its ends. As illustrated in FIG. 3, each mounting eye 46 has a through hole and is sandwiched between an upper and a lower rubber spring 48, 50 of a resilient connection 52 to allow connection to the axle boxes 18. The rubber springs consist of a rubber body bonded to an upper and a lower rigid plate and are maintained on an adjuster sleeve 56 by a locking ring 58. The adjuster sleeve 56 is provided with an internal thread screwed on the external thread of an adjuster tube 60. The adjuster tube 60 cooperates at its axial inner ends with a mounting stud 62, screwed on the axle box housing 64, so as to freely rotate about the stud axis without radial play. A hexagonal locknut 66 is screwed on the upper end of the stud 62 to prevent axial movement of the adjuster tube 60. A hexagonal locking nut 68 can be screwed on the adjuster tube 60 to lock the position of the adjuster sleeve 56.

The rubber springs 48, 50 provide a stiff vertical suspension of the cross-members 40, 42 relative to the axle boxes 18, but have low rotational stiffness and allow the cross-members to rotate relative to a horizontal transversal axis 76 parallel to the axle 12, 14 and crossing the left and right studs 62 at a centre of rotation of the resilient connection 52.

A system of five vertical links 80, 82, 84, 86, 88 support the inductor 44 relative to the cross-members. This system includes a pair of links 80, 82 centrally located at equal distance from the left and right mounting studs 62 on opposite sides of one of the cross-members 40. The system of vertical links also includes three vertical links 84, 86, 88 for connecting the inductor 44 to the other cross-member 42. The link 84 is located longitudinally on one side of the cross-member, at equal distance from the mounting studs 62, while the other two links 86, 88 are located longitudinally on the other side of the cross-member and are laterally spaced apart from one another at equal distance from the link 84. The five links are pivotally connected to the cross-members 40, 42 and to the inductor 44 through metal ball bearings. Thanks to these universal connections, the forces transmitted by the links to the cross-members are balanced and the point of application of the resultant force applied by the links on each cross-member is located on the rotation axis of the cross-member at equal distance from the mounting studs. This system of five links is therefore equivalent to a three-point leveling scheme.

A longitudinal connecting rod 90 transmits the thrust forces directly from the inductor 44 to one of the transom tubes 28 of the bogie frame 27. Two lateral links 92, 94, preferably located on the same side of the bogie, transmit lateral forces from the inductor 44 to one of the side members 26 of the bogie frame.

Each adjuster sleeve 56 and adjuster tube 60 set constitutes a height adjuster integrated in the resilient connection 52, which can be accessed from above through an aperture in the floor of the car body and is operated as follows. The locking nut 68 is released and slackened by one or two turns. The locknut 66 is then released to allow free rotation of the threaded tube. A wrench can then be engaged on the hexagonal head of the threaded tube to turn it so as to raise or lower the adjuster sleeve as required. Once the desired position has been reached, the locknut is tightened and the locking nut is tightened.

The four height adjusters are used to adjust the position of the cross-members in relation to the axle boxes and to the reaction rail on the ground. The height adjustment procedure is as follows: The bogie is first put on a section of track, which is both straight and level. The distance between the linear induction motor and the reaction rail is precisely measured at say four locations. Preferably, these locations are towards the outside edges of the inductor and in line with the cross-members. The measurement locations are symmetrical about the track centre line.

The cross level error is determined for each longitudinal end of the inductor as the difference in height between the two measurement locations at the corresponding end of the inductor. An average cross level error is then determined as the average of the front and rear cross level errors.

Adjustment of the cross level error can be made by adding half of the average cross level error to the low side of the inductor and subtracting half of the value from the high side, on cross-member 42. No adjustment needs to be made on the cross-member 40, since the corresponding end of the inductor is centrally mounted on the cross-member.

Similarly, the average height is determined at each longitudinal end of the inductor and the deviation from a predetermined nominal height is calculated. This error is the adjustment that needs to be made on the height adjusters of the corresponding cross-member.

Obviously, the cross level errors and the height error can be computed at the same time and the adjustments can be made in one step.

The height measurement could be made at three locations instead of four, one central location close to cross-member 40 and two locations towards the ends of cross-member 42.

The railway bogie described hereinbefore can be used with any kind of railway vehicle, alone or in pairs to carry a car body of any desired construction.

As can readily be appreciated, the suspension arrangement described above can be used to support a reaction plate of a linear induction motor, with the linear inductor being mounted in the guide rail for the vehicle.

The universal connections of the links can be provided with stiff resilient means.

Thus, the invention has been described by reference to the embodiment discussed above. It will be recognized that this embodiment is susceptible to various modifications and alternative forms well known to those of skill in the art. without departing from the spirit and scope of the invention. Accordingly, although a specific embodiment has been described, this is an example only and is not limiting upon the scope of the invention.

What is claimed is:

1. A railway bogie for supporting a car body of a railway vehicle, comprising:
   two wheel sets, each journalled in a pair of left and right axle boxes;
   a bogie frame, supported on the axle boxes via a primary suspension and provided with a secondary suspension for supporting the car body;
   two cross-members, each mounted on one of the pairs of left and right axle boxes via left and right resilient mounting apparatus, the resilient mounting apparatus allowing limited pivoting movement of the cross-member about a transversal axis of rotation of the cross-member, and linking apparatus for connecting a linear induction motor to each cross-member, the linking apparatus being such that the point of application of the resultant force applied by the linking apparatus on each cross-member is located at a centre position on the rotation axis of the cross-member at equal distance from the left and right mounting apparatus:

wherein the linking apparatus allows relative displacement between the linear induction motor and cross-members in a transverse direction of the bogie, the bogie further comprising lateral linking apparatus for directly transmitting lateral forces between the linear induction motor and the bogie or the car body of the railway vehicle.

2. The bogie of claim 1, wherein the linking apparatus allows relative displacement between the linear induction motor and the cross-members in a thrust direction and the bogie further comprises a thrust transmitter for directly transmitting thrust between the linear induction motor and the bogie or the car body of the railway vehicle.

3. A railway bogie for supporting a car body of a railway vehicle, comprising:
two wheel sets, each journalled in a pair of left and right axle boxes;
a bogie frame, supported on the axle boxes via a primary suspension and provided with a secondary suspension for supporting the car body;
two cross-members, each mounted on one of the pairs of left and right axle boxes via left and right resilient mounting apparatus, the resilient mounting apparatus allowing limited pivoting movement of the cross-member about a transversal axis of rotation of the cross-member, and
linking apparatus for connecting a linear induction motor to each cross-member, the linking apparatus being such that the point of application of the resultant force applied by the linking apparatus on each cross-member is located at a centre position on the rotation axis of the cross-member at equal distance from the left and right mounting apparatus;
wherein the linking apparatus includes at least two link members for connecting the linear induction motor to a first one of the two cross-members, the two link members being connected to the first cross-member at two locations laterally spaced apart on opposite sides of the centre point of the first cross member, and at least one link member for connecting the linear induction motor to the other cross-member.

4. A railway bogie for supporting a car body of a railway vehicle, comprising:
two wheel sets, each journalled in a pair of left and right axle boxes;
a bogie frame, supported on the axle boxes via a primary suspension and provided with a secondary suspension for supporting the car body;
two cross-members, each mounted on one of the pairs of left and right axle boxes via left and right resilient mounting apparatus, the resilient mounting apparatus allowing limited pivoting movement of the cross-member about a transversal axis of rotation of the cross-member, and
linking apparatus for connecting a linear induction motor to each cross-member, the linking apparatus being such that the point of application of the resultant force applied by the linking apparatus on each cross-member is located at a centre position on the rotation axis of the cross-member at equal distance from the left and right mounting apparatus;
wherein the linking apparatus includes a set of three vertical link members for connecting the linear induction motor to a first one of the two cross-members and consisting of a central link pivotally connected to the first cross-member longitudinally on one side of the first cross-member and a pair of left and right link members pivotally connected to the first cross-member on the other side of the first cross-member at two locations laterally spaced apart on opposite sides of the centre point of the first cross member and equidistant therefrom, the three link members being pivotally connected to the inductor.

5. The bogie of claim 4, wherein the linking apparatus further comprises a set of two vertical link members pivotally connected to the inductor and to the second cross-member at two locations longitudinally spaced apart on opposite sides of the axis of rotation of the second cross-member.

6. A railway bogie for supporting a car body of a railway vehicle, comprising:
two wheel sets, each journalled in a pair of left and right axle boxes;
a bogie frame, supported on the axle boxes via a primary suspension and provided with a secondary suspension for supporting the car body;
two cross-members, each mounted on one of the pairs of left and right axle boxes via left and right resilient mounting apparatus, the resilient mounting apparatus allowing limited pivoting movement of the cross-member about a transversal axis of rotation of the cross-member, wherein the left and right mounting apparatus comprise left and right height adjustment mechanisms for adjusting the distance between the cross-members and the axle boxes; and
linking apparatus for connecting a linear induction motor to each cross-member, the linking apparatus being such that the point of application of the resultant force applied by the linking apparatus on each cross-member is located at a centre position on the rotation axis of the cross-member at equal distance from the left and right mounting apparatus.

7. The bogie of claim 6, wherein each height adjustment mechanism comprises a first adjuster element provided with an internal thread, a second adjuster element provided with an external thread, one of the first and second adjuster elements being secured to the corresponding axle box and the other adjuster element being secured to the cross-member through a rubber spring.

8. A method for mounting a linear induction motor to a railway bogie for supporting a car body of a railway vehicle, the railway bogie comprising:
two wheel sets, each journalled in a pair of left and right axles boxes;
a bogie frame, supported on the axle boxes via a primary suspension and provided with a secondary suspension for supporting the car body;
two cross-members, each mounted on one of the pairs of left and right axle boxes via left and right resilient mounting apparatus, the resilient mounting apparatus allowing limited pivoting movement of the cross-member about a transversal axis of rotation of the cross-member, wherein the left and right mounting apparatus comprise left and right height adjustment mechanisms for adjusting the distance between the cross-members and the axle boxes, and
linking apparatus for connecting a linear induction motor to each cross-member, the linking apparatus being such that the point of application of the resultant force applied by the linking apparatus on each cross-member is located at a centre position on the rotation axis of the cross-member at equal distance from the left and right mounting apparatus;

the method comprising the steps of:
mounting the linear induction motor to the first and second cross-members by use of the linking apparatus; and
measuring the distance between the inductor or the cross-members and the ground or the reactive rail at least three locations,
assessing a first height deviation from a predetermined desired height at a first longitudinal end of the inductor, and a second height deviation from the predetermined desired height at a second longitudinal end of the linear induction motor, based on the measured distances,
operating the height adjustment mechanisms of the left and right mounting apparatus close to the first longitudinal end of the inductor based on the first height deviation; and
operating the height adjustment mechanisms of the left and right mounting apparatus close to the second longitudinal end of the linear induction motor based on the second height deviation.

9. The method of claim 8, wherein the left and right mounting apparatus comprise left and right height adjustment mechanisms for adjusting the distance between the cross-members and the axle boxes, the method further comprising the step of:
assessing a cross level error based on the measured distances, and
operating the height adjustment mechanisms of the left and right mounting apparatus of one of the cross-members based on the second height deviation and on the cross level error.

10. The method of claim 8, further comprising the step of:
assessing a cross level error based on the measured distances, and
operating the height adjustment mechanisms of the left and right mounting apparatus close to the second longitudinal end of the linear induction motor based on the second height deviation and on the cross level error.

11. The method of claim 8 wherein the distance between the inductor or the cross-members and the ground or the reactive rail is measured at least four locations.

12. A method for adjusting the position of a linear induction motor mounted on a railway bogie for supporting a car body of a railway vehicle, the railway bogie comprising:
two wheel sets, each journalled in a pair of left and right axle boxes;
a bogie frame, supported on the axle boxes via a primary suspension and provided with a secondary suspension for supporting the car body;
two cross-members, each mounted on one of the pairs of left and right axle boxes via left and right resilient mounting apparatus, the resilient mounting apparatus allowing limited pivoting movement of the cross-member about a transversal axis of rotation of the cross-member, wherein the left and right mounting apparatus comprise left and right height adjustment mechanisms for adjusting the distance between the cross-members and the axle boxes; and
linking apparatus for connecting a linear induction motor to each cross-member, the linking apparatus being such that the point of application of the resultant force applied by the linking apparatus on each cross-member is located at a centre position on the rotation axis of the cross-member at equal distance from the left and right mounting apparatus;

comprising the steps of:
measuring the distance between the linear induction motor or the cross-members and the ground or the reactive rail at least three locations,
assessing a first height deviation from a predetermined desired height at a first longitudinal end of the inductor, and a second height deviation from the predetermined desired height at a second longitudinal end of the linear induction motor, based on the measured distances,
assessing a cross level error based on the measured distances,
operating the height adjustment mechanisms of the left and right mounting apparatus close to the first longitudinal end of the linear induction motor based on the first height deviation; and
operating the height adjustment mechanisms of the left and right mounting apparatus close to the second longitudinal end of the linear induction motor based on the second height deviation and on the cross level error.

13. The method of claim 12 wherein each height adjustment mechanism comprises a first adjuster element provided with an internal thread, a second adjuster element provided with an external thread, one of the first and second adjuster elements being secured to the corresponding axle box and the other adjuster element being secured to the cross-member through a rubber spring.

14. The method of claim 12 wherein the distance between the inductor or the cross-members and the ground or the reactive rail is measured at least four locations.

* * * * *